United States Patent [19]

Hatch et al.

[11] 4,319,893

[45] Mar. 16, 1982

[54] MAGNETICALLY STABILIZED BED, TEMPERATURE, PARTIAL PRESSURE SWING, HYDROGEN RECOVERY PROCESS

[75] Inventors: Walter H. Hatch, Summit, N.J.; George J. Balinsky, Baton Rouge, La.; Steve Ackerman, Randolph, N.J.

[73] Assignee: Exxon Research & Engineering Co., Florham Park, N.J.

[21] Appl. No.: 183,379

[22] Filed: Sep. 2, 1980

[51] Int. Cl.³ .............................................. B01D 53/19
[52] U.S. Cl. ........................................... 55/60; 55/68; 55/75; 55/79
[58] Field of Search ..................... 55/3, 34, 60, 77, 79, 55/99, 68, 74, 75

[56] References Cited

U.S. PATENT DOCUMENTS

| | | | |
|---|---|---|---|
| 2,539,005 | 1/1951 | Berg | 55/79 X |
| 2,616,515 | 11/1952 | Berg | 55/60 |
| 2,630,877 | 3/1953 | Berg | 55/79 X |
| 2,883,333 | 4/1959 | Oliver | 55/79 X |
| 4,115,927 | 9/1978 | Rosensweig | 55/3 X |
| 4,247,987 | 2/1981 | Coulaloglou et al. | 55/3 X |
| 4,255,403 | 3/1981 | Mayer et al. | 55/3 X |

*Primary Examiner*—Robert H. Spitzer
*Attorney, Agent, or Firm*—Llewellyn A. Proctor

[57] ABSTRACT

An adsorption process for the recovery of hydrogen from a feed gas or vapor which contains hydrogen in admixture with one or more hydrocarbon components, alone or in admixture with non-hydrocarbon components. Particulate adsorbent solids are provided with a magnetizable component, or components, and circulated between an adsorption zone in which hydrogen is concentrated in the off gas by contact of the adsorbent solids with the feed, and hydrogen recovered, and a desorption zone in which the exhausted solids are regenerated. Within the adsorption zone the feed is countercurrently contacted with the solids at relatively low temperature to selectively adsorb hydrocarbon, and perhaps other non-hydrogen components. The solids are formed into a moving, fluidized bed, and magnetically stabilized to suppress gross solids circulation while hydrocarbons are adsorbed from the feed. Occluded hydrogen is subsequently displaced from the particulate adsorbent solids with hydrocarbons, and the hydrocarbon enriched particulate adsorbent solids are then transported to the desorption zone. In the desorption zone the solids are fluidized, and the temperature of the bed is elevated sufficiently to desorb at least a portion of the hydrocarbons. The residual hydrocarbons are subsequently displaced by contact with stream in a magnetically stabilized bed of the solids. The wet solids are then dried by contact with hydrogen to displace the water, or steam, and then cooled to complete the regeneration.

11 Claims, 1 Drawing Figure

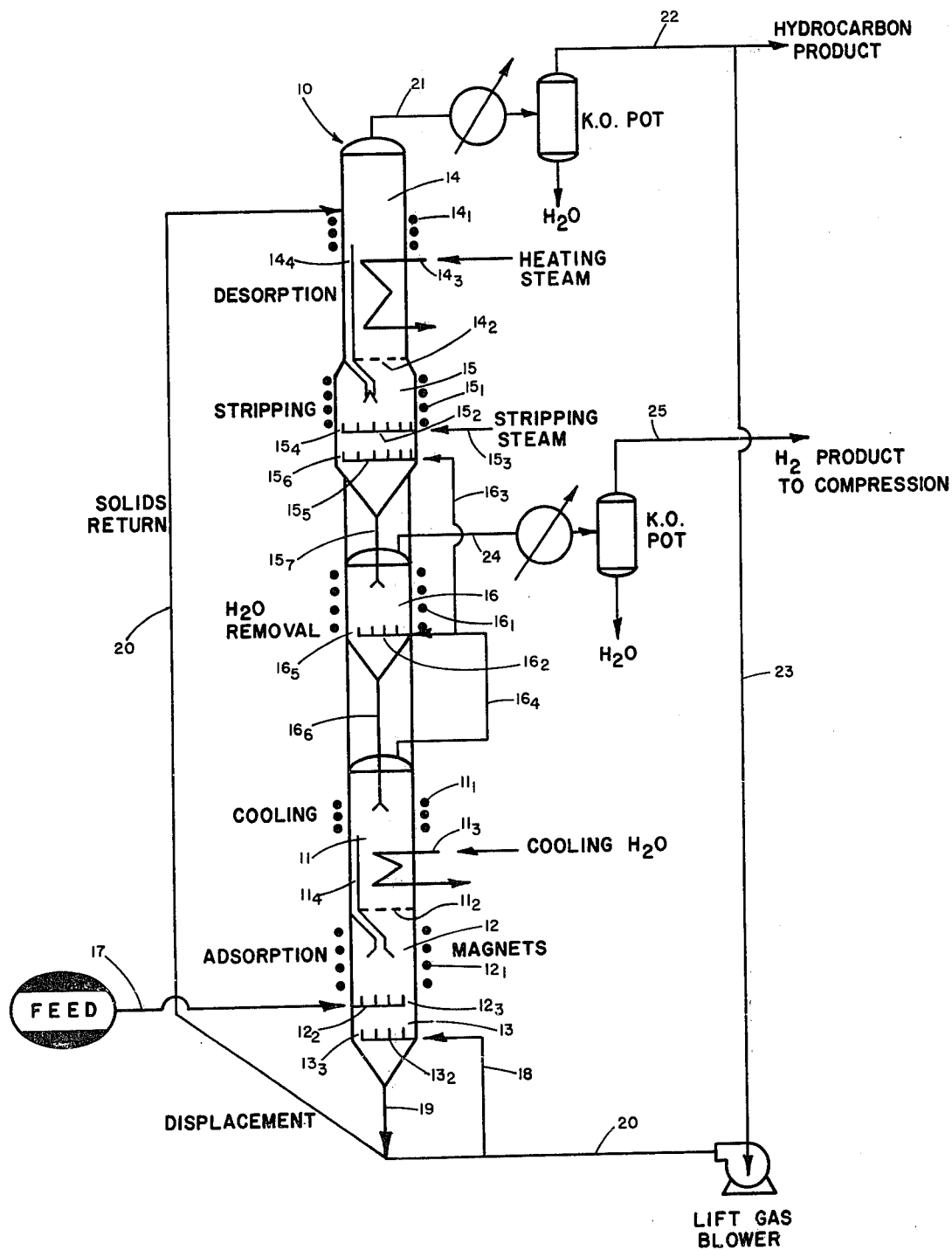

MAGNETICALLY STABILIZED BED, TEMPERATURE, PARTIAL PRESSURE SWING, HYDROGEN RECOVERY PROCESS

BACKGROUND OF THE INVENTION AND PRIOR ART

The demand for hydrogen for use in refining operations increases rapidly, and this has become a matter of acute concern. Shifts to higher sulfur level feeds as the demand for distillate products rise and environmental requirements (which restrict the sulfur content of refined products) are a major cause of the increasing demand. Thus, e.g., hydrotreating, hydrodesulfurization and hydrocracking operations consume more and more hydrogen. On top of this commercialization of new synthetic crude developmental processes will further increase this demand. More efficient methods for the recovery of hydrogen from off-gas streams are now mandatory.

The use of solid adsorbents for selectively separating hydrocarbons such as methane, ethane, and the like, and other non-polar and polar compounds such as nitrogen, carbon monoxide, carbon dioxide, and the like, from hydrogen has been disclosed in various publications, inclusive of both the technical and patent literature. Adsorbents disclosed in the literature for such purpose include generally, activated charcoal, activated bauxite, activated alumina, silica gel, silica alumina, molecular sieves, inclusive of synthetic zeolites and the socalled carbon molecular sieves, and the like. A complete cycle of operation in a selective adsorption process generally requires regeneration of the exhausted solids adsorbent, and to provide a continuous operation, the adsorption unit must be cycled between adsorption and desorption modes; preferably, both adsorption and desorption being conducted concurrently. The adsorbed material can be removed from the adsorbent solids by purging the solids with an inert gas, or by displacement of the adsorbed material from the adsorbent solids by contact with a more strongly adsorbent compound, without change of temperature or pressure. However, a thermal or pressure swing technique is generally used to regenerate the adsorbent. In thermal swing processes, a bed of the adsorbent solids is heated to a temperature above that at which the bed of adsorbent was employed in the adsorption mode, sufficient to reduce the adsorptive tendency of the adsorbate which can then be removed by a stream of purge gas. In pressure swing processes, the ambient pressure upon the adsorbent solids is dropped below that at which the bed of adsorbent was employed in the adsorption mode, sufficient to reduce the adsorptive capacity of the adsorbate which can then be removed by a stream of purge gas.

In most selective adsorption processes, a fluid, notably a gas or vapor, is brought into contact with a bed, or beds, of the adsorbent solids, one or a plurality of beds being contacted with the gas or vapor to effect a selective separation of a compound, or compounds, from the gas in an adsorption step, while the adsorbed compound, or compounds, is being desorbed in one or a plurality of other beds to regenerate the adsorbent solids, supra. Whereas fixed beds of adsorbent are the most common, fluidized beds have been used to reduce certain of the recognized deficiencies of fixed bed operations, viz., extensive valving and manifolding, and heat waste due to cyclically heating and cooling flow lines, vessel walls and internal vessel components. Nonetheless, fluidized bed adsorption processes too have their limitations, albeit they eliminate or reduce the need for valving, manifolding, as well as facilitate the transport of solids, and provide good heat transfer characteristics, due largely to solids circulation and solids back-mixing. In fact, this latter feature, the very feature which assures good heat transfer and isothermal conditions within a fluidized bed in itself proves disadvantageous in adsorption processes. Consequently, to lessen solids back-mixing a plurality of vertically spaced shallow fluidized beds are generally employed to provide stage-wise contacting between gas and adsorbent. The complexity introduced into fluidized adsorbent processes due to such staging has militated against the more general use of fluidized beds for selective separations in gas treating.

In U.S. Pat. No. 4,283,204, there is disclosed a process for the separation of contaminants from gases using a magnetically stabilized fluidized bed as disclosed in U.S. Pat. No. 4,115,927, issued Sept. 26, 1978, to R. E. Rosensweig. Adsorption and desorption of contaminants from the feed takes place in a fluidized (i.e., expanded and levitated) bed accomplished without the need for a plurality of vertically spaced shallow beds by employing an applied magnetic field to stabilize or structure the fluidized bed. A bed, so stabilized, takes on the appearance and many of the characteristics of a fixed bed with substantially no gross solids circulation or recirculation (except for the plug flow movement of the solids through the vessels) and there is very little, if any, gas by-passing. The application of the magnetic field enables the application of superficial fluid flow rates 2, 5, 10, or 20 or more times the superficial fluid flow rate of the fluidized bed at incipient fluidization in the absence of the applied magnetic field, concomitant with the absence of bubbles. As the superficial fluid velocity is increased, the pressure drop through the bed is similar to that which would be expected from a normal fluidized bed without the application of a magnetic field; it increases to the bed weight support value at the minimum fluidization velocity, and then remains relatively constant as the fluid velocity is increased. This stably fluidized bed condition persists even as the solids are continuously moved in a descending, substantially plug flow manner through the contacting vessels. Countercurrent staged flow of the solids with respect to the flow of gases used to fluidize the bed is achieved, this resulting in reduced overall investment and operating cost, as contrasted with prior art processes. Moreover, better retention of the particles within the bed directly resulting from the influence of the applied magnetic field makes possible the use of smaller particles, this providing better heat and mass transfer between the reactants.

Whereas however, this proves an admirable process for the separation of contaminants from gases, further improvements are nonetheless desirable, and necessary.

It is, accordingly, the primary objective of this invention to provide a new and improved process of this general type, particularly one suitable for the more efficient purification of a vapor, or gas feed.

A further object is to provide a process utilizing the application of a magnetic field for the recovery, and purification of hydrogen by the selective adsorptive separation of non-hydrogen components from off-gas streams which contain hydrogen.

A yet further, and more particular object is to provide a magnetic bed process, as characterized, for the selective adsorptive separation of a hydrocarbon component, or hydrocarbon components, from an admixture which contains hydrogen in admixture with a hydrocarbon, admixture of hydrocarbons, especially normally gaseous hydrocarbons, or these alone or contaminated with non-hydrocarbon compounds (i.e., acidic, polar or non-polar compounds), to provide hydrogen at a selected level of purity with higher hydrogen recovery than heretofore believed feasible.

A more specific object is to provide a magnetically stabilized bed, temperature and partial pressure-swing process for hydrogen recovery from process streams.

These objects and others are achieved in accordance with the present invention, which comprises an improved adsorptive process for the more efficient recovery of hydrogen from a hydrogen-containing feed wherein particulate adsorbent solids are provided with a magnetizable component and circulated between an adsorption zone for the selective adsorption of non-hydrogen components which concentrate the hydrogen within the off gas, and a desorption zone wherein the adsorbed components of the particulate adsorbent solids are desorbed in a heat swing operation, or heat/partial pressure swing operation, the said particulate adsorbent solids regenerated, cooled, and recycled to said adsorption zone, especially improvements in the adsorption/hydrocarbon displacement operation which is characterized by (a) contacting countercurrently said feed, preferably adiabatically, in said adsorption zone with a downwardly moving, fluidized bed of the particulate adsorbent solids, magnetically stabilizing said bed to suppress the gross circulation of adsorbent solids within said bed, while adsorbing hydrocarbons from said feed on said bed, withdrawing from said adsorption zone a hydrocarbon-denuded gas stream of higher hydrogen content than that contained in the feed entering said magnetically stabilized adsorption zone, withdrawing hydrocarbon enriched, hydrogen-containing particulate adsorbent solids from said magnetically stabilized adsorption zone and passing same to a hydrogen displacement zone, and then (b) contacting countercurrently said hydrocarbon enriched, hydrogen containing particulate adsorbent solids in said hydrogen displacement zone by passing same in plug flow and contacting same with a hydrocarbon gas sufficient to substantially displace hydrogen, passing the displaced hydrogen into the adsorption zone, and removing the hydrogen-denuded, hydrocarbon-containing particulate adsorbent solids from said hydrogen displacement zone and transporting same to the desorption zone.

In said magnetically stabilized bed adsorption step (a), supra, the feed is injected into the bottom of the zone and flows countercurrent to the slowly descending stably fluidized bed of adsorbent, the gas rising within this zone sufficient to overcome gravity and cause bed expansion and fluidization (the magnetic field being applied in the same direction as the field due to gravity), increasing in its hydrogen content as it rises to the top of the bed; and conversely, the hydrocarbon content of the adsorbent solids increasing as the solids descend to the exit side of the bed. Preferably, the particulate adsorbent solids enter the adsorption zone at a temperature ranging from about 40° F. to about 300° F., preferably from about 130° F. to about 250° F., and exit the adsorption about 10° F. to about 150° F. higher, preferably about 10° F. to about 100° F. higher, than the temperature of the entering particulate adsorbent solids, since adsorption is an exothermic reaction dependent to some extent upon the nature of the adsorbent, and adsorbent solids. In a typical operation, wherein preferred adsorbent solids were employed, viz., a ferromagnetic 5A molecular sieve composite and a ferromagnetic activated carbon composite, the particulate adsorbent solids entered the zone at a temperature of about 200° F. with the temperature rising to about 260° F. at the gas inlet point due to the exothermic heat of reaction.

In hydrocarbon displacement, step (b), supra, the bed of hydrocarbon enriched particulate adsorbent solids removed from said adsorption zone is contacted with a stream of hydrocarbon gas, suitably a recycle hydrocarbon gas stream from the process, the hydrocarbon gas stream entering the bottom of this zone to displace hydrogen from the interstices and pores of the spent particulate adsorbent solids, the volume of hydrocarbon gas added being essentially equal to the volume of gas displaced, viz. the sum-total of hydrogen plus the residual feed gas components contained within the interstices and pores of the particles. In displacing hydrogen in this manner, virtually no hydrogen leaves the zone with the adsorbent solids, and an interface is formed below which virtually no hydrogen is found. The particulate adsorbent solids removed from the zone are substantially free of hydrogen, this increasing overall hydrogen recovery.

When the adsorbent solids are introduced into the hydrogen displacement zone as a slumped bed, moving in plug flow and countercurrently contacted with the hydrocarbon displacement gas, the upper portion of the hydrogen displacement zone is operated at the temperature at which the countercurrently contacted, plug flow solids enter the zone from the adsorption zone, the exit temperature increasing generally from about 10° F. to about 100° F., generally about 20° F. to about 50° F. With said preferred ferromagnetic 5 A molecular sieve and ferromagnetic activated carbon the exit temperature typically ranges about 30° F. above the entering temperature of the solids. Suitably, and preferably, a temperature gradient can be provided by the addition of heat; the bottom of the bed being operated at a temperature ranging from about 60° F. to about 450° F., preferably from about 160° F. to about 350° F. above the top bed temperature.

In another of its preferred aspects, the hydrogen displacement zone is operated by the imposition of a magnetic field upon a downwardly flowing fluidized bed of the particulate adsorbent solids, sufficient to stabilize the bed; and the bed countercurrently contacted with the hydrocarbon gas. The temperature of the bed at the top ranges from about 50° F. to about 400° F., preferably from about 150° F. to about 300° F., and the bottom of the bed is operated at a temperature of about 60° F. to about 450° F., preferably from about 160° F. to about 350° F., above the top bed temperature. The temperature gradient maintained on the bed displaces essentially all traces of hydrogen from the particulate adsorbent solids which exit from the bed.

The desorption, or regeneration phase of the operation is begun by transporting the hydrogen denuded, hydrocarbon-containing particulate adsorbent solids to the desorption zone. (c) In said desorption zone, a fluidized bed of said hydrogen denuded, hydrocarbon-containing particulate solids is formed and heated at temperature sufficient to desorb hydrocarbons from said particulate solids, hydrocarbons are removed from said zone, and the particulate adsorbent solids which contain at least residual amounts of hydrocarbons are passed to a stripping zone, and the hydrocarbons stripped therefrom as by contact with a stripping agent, suitably hydrogen. Preferably, however, the hydrocarbons are stripped from the adsorbent solids by stripping with steam. (d) In said steam stripping zone, the residual hydrocarbons-containing particulate adsorbent solids can be formed as a moving, slumped bed, but preferably are formed as a fluidized bed, magnetically stabilized to suppress the gross circulation of adsorbent solids within the bed, while said bed is contacted countercurrently with steam to desorb, and substantially displace the residual hydrocarbons.

Desorption of the hydrocarbons from the hydrogen-denuded, hydrocarbon-containing particulate adsorbent solids within the desorption zone (c), supra, is conducted in a fluidized bed which is heated to desorption temperature, viz., temperatures ranging from about 300° F. to about 600° F., preferably from about 350° F. to about 450° F. The heat is generally supplied by means of a heat exchanger, e.g., a coil mounted within the fluidized bed of solids through which a pressurized hot fluid, usually steam, is passed. The partially desorbed solids are passed from the desorption zone to the hydrocarbon stripping zone (d) into which steam is directly injected to maintain desorption temperature, the steam simultaneously stripping hydrocarbon via competitive adsorption and partial pressure reduction, and heating the adsorbent solids, at least in part via water adsorption. The temperature of the desorption zone generally ranges from about 300° F. to about 600° F., preferably from about 350° F. to about 450° F. The wet particulate solids are then transported to a steam displacement, or water removal zone, preferably involving a sequence of steps wherein hydrogen is used first to displace steam from the interstices and pores of the solids, and then water is stripped from the sorbent solids while effecting evaporative cooling in a fluid bed cooling zone prior to recycle of the adsorbent particles to the adsorption zone.

A sequence of stages is preferably employed in the process of removing water, and cooling the adsorbent particles. In the first such stage product hydrogen is used to displace the steam from the interstices and pores of the particulate adsorbent particles. The hydrogen countercurrently contacts the adsorbent particles at a rate to essentially equal the volume of steam, or water, in the interstices and pores. In displacing steam in this manner virtually no steam or gaseous hydrocarbon is carried to the water removal stage wherein the water adsorbed on the adsorbent particles is removed. The steam displacement stage minimizes the amount of stripping steam required in the hydrocarbon stripping zone (d) by more effectively utilizing the steam injected into the zone.

Additionally the steam displacement stage prevents any residual gaseous hydrocarbon left in the interstices or pores of the adsorbent particles from contaminating the purified hydrogen which is recovered downstream in a more advanced stage of the operation.

In the second stage of the water removal/cooling zone, i.e., the evaporative stage cooling stage, the adsorbent particles are countercurrently contacted with product hydrogen which has been injected into the bottom of the stage at a rate sufficient to strip essentially all the water from the adsorbent particles. The removal of water evaporatively cools the adsorbent particles from their inlet temperature ranging from about 300° F. to about 550° F., preferably from about 350° F. to about 450° F., to an exit temperature ranging from about 200° F. to about 500° F., preferably from about 250° F. to about 350° F. The dried adsorbent solids are then transported to a cooling zone for adjustment of the temperature of the solids to adsorption temperature.

The cooling zone is one wherein a fluidized bed of regenerated particulate adsorbent solids is established, and maintained in heat exchange relationship with a coolant, suitably cooling water with heat rejection to the cooling water. Within the fluid bed cooling zone the temperature of the adsorbent solids is adjusted to the desired adsorption temperature, and then transported to the adsorber.

In a preferred mode of operation these several zones are employed to provide a continuous single train temperature swing adsorption/desorption process utilizing countercurrent plug flow of sorbent and gas, which permits the use of small particle size sorbent to provide faster sorption-desorption rates, and fluid bed heat transfer zones providing optimum staging and approach to equilibrium. A specific process of this type providing high recovery (e.g., 95+%) of high purity (e.g., 95+%) hydrogen utilizes an adiabatic, magnetically stabilized adsorption section for countercurrent contacting, with substantially complete displacement of the feed gas from the adsorbent solids; a staged desorption section, especially a two-zone desorption section, inclusive of a first desorption stage which uses a fluidized bed to heat the adsorbent solids to desorption temperature, and a second desorption zone which utilizes steam for stripping and to provide adsorption heat; and a staged water removal/cooling section, especially a three-step cooling section, a first wherein hydrogen is used to displace steam and residual gaseous hydrocarbons from the interstices and pores of the particulate adsorbent solids, a second wherein water is removed from the adsorbent solids to provide evaporative cooling, and a third wherein further cooling to adsorption temperature is provided in a fluidized bed. The separation takes place at feed gas pressures and can be achieved at pressures ranging from about 50 pounds per square inch gauge (psig) to about 1200 psig, preferably from about 200 psig to about 700 psig, fuel gas being returned at essentially feed gas pressure. High purity and recovery are obtained by using a countercurrent flow of feed gas.

These features and others will be better understood by reference to the following more detailed description of the invention, especially a preferred embodiment shown by reference to the attached drawing to which reference is made.

In the drawing:

The FIGURE depicts, by means of a simplified flow diagram, a preferred magnetically stabilized bed temperature swing hydrogen recovery process adsorption-desorption unit 10 as used in the recovery of hydrogen from a gaseous admixture of hydrogen and hydrocarbons from refinery effluents. Cyclone separators, bed levels, compressors, pumps, and other auxiliary equipment for the most part have been omitted from the drawing for simplification.

Referring generally to the FIGURE it will first be observed that the unit 10 necessarily includes a sorption or adsorption portion and a desorption portion, the adsorption portion of the unit in this instance being located at, or near, the bottom of the vessel while the latter is located at the top of the vessel. The (1) sorption or adsorption portion of the unit 10, on the one hand, thus includes an upper cooling section 11, an adsorption section 12 to the lower side of which the hydrogen-containing feed gas or vapor is introduced, and a hydrogen displacement section 13. The (2) desorber or desorption portion of the unit 10, on the other hand, includes a desorption section 14, a stripping section 15, and a water removal section 16. In such unit 10 hydrocarbons are adsorbed from an upwardly flowing hydrogen/hydrocarbon admixture by downwardly moving adsorbent solids, within the adsorption portion of the unit, adsorbed hydrogen is displaced and the hydrogen-denuded, hydrocarbon-enriched adsorbent solids then transported to the desorption portion of the unit for the extraction and recovery of the hydrocarbons to regenerate the adsorbent solids, and produce a hydrogen product. It is quite evident also that (1) the sorption or adsorption portion and (2) desorber or desorption portion of the unit can be alternately located one with respect to the other, or the operations conducted in separate vessels. A convenient alternate unit might thus comprise (1) a first vessel which contains an upper cooling section 11, an intermediate level adsorption section 12 to the lower portion of which the gaseous feed is introduced, and a lower displacement section 13, and (2) a second vessel which contains an upper desorption section 14, intermediate stripping section 15 and water removal section 16, in which unit the process gas, i.e., hydrogen or hydrocarbon, is used to lift the solids to the top of each vessel, respectively.

The operation and function of each of these sections, beginning with the adsorption or "sorber side" of the unit is as follows:

The adsorption section 12 is operated adiabatically, and contains a magnetically stabilized bed of adsorbent solids. It is further characterized in that the bed is decending, or downwardly moving, and the bed of particulate adsorbent solids are preferably of a ferromagnetic activated carbon or molecular sieve composite. Thus, the bed is stably fluidized by ascending gases while acted upon by a magnetic field produced by a coiled magnet $12_1$ externally concentrically fitted about the wall of the vessel, the gases being constituted in part by the gaseous feed which is introduced into the bottom of the adsorption section 12 through distributor $12_2$, via line 17, and hydrocarbon stripping gas which flows upwardly from hydrocarbon displacement section 13. Gas of relatively low hydrogen content thus enters the bottom of this section and flows countercurrent to the slowly descending stably fluidized adsorbent solids. As the gas flows upwardly through the bed of the adsorption section 12, hydrocarbons, and other non-hydrogen components are adsorbed on the sorbent solids. Adsorption of the hydrocarbons produces heat, and accordingly the solids which are introduced into the adsorption section 12 are cooled by a predetermined amount within the cooling section 11 prior to their introduction into adsorption section 12.

Cooling of the adsorbent solids within cooling section 11, prior to their introduction into adsorption section 12, is accomplished by maintaining the particulate adsorbent solids in a fluidized state to achieve good heat transfer, while cooling. The bed of stably fluidized adsorbent solids, which rests atop grid $11_2$, is cooled, e.g., via use of a heat transfer coil $11_3$ located into the vessel through which cooling water is passed during the operation. A filter can be provided, if desired, above the top of the bed via use of a magnetic field coil $11_1$ surrounding the upper vessel exterior, above the bed surface. The cooled adsorbent solids are introduced into the adsorption section 12 via overflow through weir $11_4$, and the downwardly flowing adsorbent solids are replenished within the bed of the cooling section 11 by freshly regenerated adsorbent solids from water removal section 16 of the desorption portion of the unit. Solids leaving the adsorption section 12 are passed downwardly via overflow of the distributor $12_2$ as via passage $12_3$, the solids flowing into hydrogen displacement section 13.

The hydrogen displacement section 13 constitutes a key and novel feature of the process. Recycled hydrocarbon gas is introduced into this section to displace hydrogen from the interstices and pores of the spent adsorbent solids. Unavoidably, the adsorbent solids which are transferred from the adsorption section 12 thus contain a relatively large amount of hydrogen both within the interstitial volume, or volume between the adsorbent solids particles, and the pore volume of the adsorbent solids, and to the extent that hydrogen is present in the adsorbent solids passed to the desorption section 14 it is wasted through contamination with gases which exit the system in regeneration of the adsorbent solids. Thus, if the adsorbent solids were removed directly to the desorption section 14, then this hydrogen would be stripped off by the hydrocarbons and exit the unit with the desorber gas, thereby reducing hydrogen recovery. In the operation of the displacement section 13 therefore, a portion of the hydrocarbon product substantially equal in volume to the volume of hydrogen and residual feed gas components contained in the voids and pore volume of the adsorbent solids is added via line 18 through distributor $13_2$ to substantially totally displace, or displace to the full extent possible, the hydrogen contained within the voids and pore volume of the adsorbent solids such that the adsorbent solids which are overflowed or passed through distributor 13 as via passage $13_3$ and picked up via the hydrocarbon lift gas as they exit the displacement section 13 via line 19 are substantially devoid of hydrogen.

In a preferred operation of the hydrogen displacement section 13, the entering adsorbent solids particles are moved in plug flow, without application of a stabilizing magnetic field, countercurrent to the ascending stream of recycle hydrocarbon introduced via line 18. The adsorbent solids particles are thus purged of hydrogen and gradually slump or move closer together to aid in the displacement of hydrogen. By careful adjustment of the flow of hydrocarbon recycle stream a boundry is formed within this section below which the downwardly moving solids contain essentially no hydrogen. In another preferred operation, the adsorbent solids particles of the stripping section 13 can be stabilized as a bed by the application of a magnetic field to aid in the transport and movement of the particles from the section. In this embodiment the elimination of hydrogen from the purged solids is aided by establishing a temperature gradient between the bottom and the top of the bed. Suitably low level heat from a suitable source can be exchanged with the top of the bed, and high level (i.e., higher temperature) heat from a suitable source can be exchanged with the bottom of the downwardly moving, stably fluidized bed.

In the first portion of the desorption cycle the adsorbent solids are heated in a fluidized bed to desorption temperature to desorb some hydrocarbons, residual hydrocarbons are removed in the steam stripping section 15; and then the water is removed from the adsorbent solids by treatment with hydrogen.

Adsorbent solids nearly saturated or saturated with hydrocarbons, but devoid or substantially devoid of hydrogen are picked up on discharge from line 19, lifted and fed via solids return line 20 into desorption section 14. The bed of adsorbent solids contained therein is fluidized, to improve heat transfer between the adsorbent solids; the bed being fluidized by wet gases which ascend through grid $14_2$ atop which the bed rests. Suitably, a filter is maintained above the bed to suppress the escape of solids from the top of the bed. Thus, a magnetic field can be maintained well above the top level of the bed, e.g., by use of magnetic coil $14_1$. The bed is heated by an internal heat exchange coil $14_3$ through which steam is passed. The heating of the adsorbent solids forces the interstitial gas out of the solids by desorption and thermal expansion, and the wet ascending gas introduced into the desorption section 14 aids in displacing the hydrocarbons. The desorbed hydrocarbons exits the desorption section 14 with the wet gas via line 21. The exit gas is heat exchanged, fed into a knock-out pot to eliminate water, the uncondensed gas recovered as a hydrocarbon product from line 22, while a portion thereof is recycled via line 23,20 for use as an adsorbent solids lift gas, and hydrogen displacement gas in hydrogen displacement section 13. The partially regenerated adsorbent solids are passed via overflow weir $14_4$ to steam stripping section 15 for further removal of hydrocarbons.

The partially regenerated adsorbent solids, transferred into the steam stripping section 15 from desorption section 14, are introduced into a bed fluidized by gases from below passed through distributor $15_2$. The fluidized bed is acted upon by a stabilizing magnetic field applied, e.g., via use of an externally mounted magnetic coil $15_1$. Steam is injected into the bed through line $15_3$, the steam virtually purging the pores of the adsorbent solids of hydrocarbons, and heating the hydrogen denuded adsorbent solids. The heated, hydrogen denuded adsorbent solids overflow the distributor $15_2$, leaving via passage $15_4$ to enter into the first of a series of staged water removal zones, in this instance two staged zones. In the first zone the steam is displaced from the interstices and pores of the adsorbent solids particles with hydrogen to effect better heat utilization, and suppress possible contamination of the product hydrogen with hydrocarbons.

The wet hydrocarbon denuded adsorbent solids pass distributor $15_2$, thus pouring into a downwardly moving slumped, or falling bed of said material. The bed formed is contacted with hydrogen introduced to distributor $15_5$ via line $16_3$. A major portion of the steam is therein displaced from the interstices and pores of the adsorbent solids, this suppressing contamination of the product hydrogen as would occur if most of the hydrocarbons were transferred with the adsorbent solids to the second water removal stage. The partially dried adsorbent solids overflow the bed via passageway $15_6$ of distributor $15_5$ to enter via dipleg $15_7$ the second water displacement, or water removal zone, viz., water removal section 16. In this second zone, the partially dried adsorbent solids are fluidized by hydrogen injected through distributor $16_2$ from line $16_4$, and the fluidized bed is stabilized by a magnetic field generated via an externally mounted magnetic coil $16_1$. The injected hydrogen removes essentially all of the residual water from the adsorbed solids particles. The dry, regenerated adsorbent solids particles are then flowed via passageway $16_5$ of distributor $16_2$, and dipleg $16_6$ into the cooling section 11 of the adsorption portion of the unit. Wet gases from the water displacement section 16 is passed via line 24 through a heat exchanger into a water knock-out pot, and the hydrogen product withdrawn via line 25.

The following is further exemplary of the invention.

EXAMPLE

For convenience, reference is again made to the FIGURE, and to the Table given below. The bracketed numbers refer to the Table, the Table giving the composition, temperature, flow rates, etc. at different locations within the process.

A feed stream, [1], consisting of 75% $H_2$ and 25% hydrocarbons at 200 psig is introduced into the adiabatic adsorption zone 12 where it is countercurrently contacted with the descending particulate carbon solids (containing 30 wt. % stainless steel powder as an inclusion). The rate of solids movement is approximately $1.70 \times 10^5$ lbs/hr. The temperature of the carbon solids increase as adsorption occurs such that at the feed inlet point, the solids are at 265° F. and contain 7.1 lb. hydrocarbon/100 lbs. carbon. As the solids continue to fall below the feed inlet point, they carry feed gas with them in the interstices between particles and in the pores within the particles; and the feed gas contains a significant amount of hydrogen which could not be recovered if it were allowed to enter the desorption section. The feed gas, accordingly, is displaced with a rising recycle gas stream [8] containing 3.2% $H_2$ injected into zone 13 via line 18. The recycle stream, [8], is added at a rate exactly equal to the downward flow of feed gas being carried by the descending solids. Because of the higher hydrocarbon partial pressure in the displacement zone, additional hydrocarbon is adsorbed such that as the carbon leaves the bottom of the vessel via line 19, the temperature is 290° F. and the hydrocarbon loading is 9.6 lb. hydrocarbon/100 lbs. of carbon.

The solids leaving the bottom of the column are transported via line 20 to the desorption section at the top of the column by a hydrocarbon recycle gas stream [7]. The solids are heated to a desorption temperature of 390° F. in the fluid bed of zone 14. Heat exchange with condensing 600 psig steam, stream [15], supplies the necessary heat. The fluidizing gas is supplied from the stripping section immediately below the fluid bed; the fluidizing gas consisting of stripping steam introduced by line $15_3$ and the hydrocarbon desorbed in the stripping section. Some desorption occurs in the fluid bed desorption section such that the carbon leaving the fluid desorption section, stream [S-9], contains 5.2 lbs. hydrocarbon/100 lbs. carbon, and it contains 1.2 lbs. of adsorbed water/100 lbs. carbon.

Most of the residual hydrocarbon remaining on the carbon leaving the fluid bed is removed in the stripping zone. In the stripping zone, the descending solids are countercurrently contacted with 200 psig stripping steam introduced via line $15_3$, stream [5], which has been directly injected into the bed. A portion of the steam is adsorbed on the carbon. The heat of adsorption of the water is mostly offset by the heat of desorption of the hydrocarbon such that the temperature of the solids leaving the adiabatic stripping vessel via line $15_7$ is 400° F. These solids contain 1.1 lbs. hydrocarbon/100 lbs. carbon and 3.8 lbs. $H_2O$/100 lbs. of carbon.

The solid, as it passes the steam injection point carries steam with it in the interstices, and in the pores. The steam in the interstices and pores would not be utilized if it were allowed to be carried downward with the solids. Consequently, the steam is displaced with $H_2$, introduced via line $16_3$, stream [3]. As in the adsorber displacement section, the hydrogen stream [3], is added to exactly balance the downward flow of steam being carried in descending voids between particles and in the pores of the particles.

The carbon leaving the stripping zone contains adsorbed water which is removed in the adiabatic water removal zone 16. In this zone, a hydrogen stream [2] from cooling zone 11, is countercurrently contacted with the carbon to strip the water from the carbon. The removal of water evaporatively cools the solid from 400° F. to 300° F. The countercurrent contact with $H_2$ in the evaporative cooler also strips additional hydrocarbon from the carbon such that the solids leaving the evaporative cooler via dipleg $16_6$, stream [S-11] contain 0.4 lbs. hydrocarbon/100 lbs. carbon and 0.3 lb. of $H_2O$/100 lbs. of carbon. The hydrocarbon which is removed in the evaporative cooler leaves with the product $H_2$, stream [4], resulting in a $H_2$ product of 96.4% purity. Lower or higher purity product could be obtained by adjusting the steam stripping rate stream [5], to leave either more or less hydrocarbon on the carbon leaving the stripper.

Further cooling of the solid, from 300° F. to 200° F., is effected in fluid bed cooler 11. Heat exchange with cooling water stream at 1232 gal/min., is used to cool the solids. $H_2$ product gas flows upward from the adsorber, stream G-12, thru a grid and provides the fluidization. After being cooled to 200° F., the solids [S-12] re-enter the adsorber.

TABLE

| | Stream | | | | |
|---|---|---|---|---|---|
| | 1 | 2 | 3 | 4 | 5 |
| MSCF/D | 10 | 7.6 | 0.96 | 7.7 | 4.45 |
| Mole % | | | | | |
| $H_2$ | 75 | 97.2 | 97.2 | 96.4 | — |
| Hydrocarbon | 25 | 0.4 | 0.4 | 3.6 | — |
| $H_2O$ | — | 2.4 | 2.4 | — | 100 |
| Mole/Hr | 1096 | 837 | 106 | 844 | 488 |
| Lb/Hr | | | | | |
| Carbon | — | — | — | — | — |
| Stainless Steel | — | — | — | — | — |
| Steam | — | — | — | — | 8.8 × 10³ |
| Wt. % on Carbon | | | | | |
| Hydrocarbon | — | — | — | — | — |
| $H_2O$ | — | — | — | — | — |
| Temperature, °F. | 85 | 200 | 200 | 110 | 382 |

| | Stream | | | | |
|---|---|---|---|---|---|
| | 6 | 7 | 8 | S-9 | S-10 |
| MSCF/D | 2.3 | 3.5 | 2.1 | — | — |
| Mole % | | | | | |
| $H_2$ | 3.2 | 3.2 | 3.2 | — | — |
| Hydrocarbon | 96.8 | 96.8 | 96.8 | — | — |
| $H_2O$ | — | — | — | — | — |
| Mole/Hr | 252 | 383 | 226 | — | — |
| Lb/Hr | | | | | |
| Carbon | — | — | — | 1.2 × 10⁵ | 1.2 × 10⁵ |
| Stainless Steel | — | — | — | 0.5 × 10⁵ | 0.5 × 10⁵ |
| Steam | — | — | — | — | — |
| Wt. % on Carbon | | | | | |
| Hydrocarbon | — | — | — | 5.2 | 1.1 |
| $H_2O$ | — | — | — | 1.2 | 3.8 |
| Temperature, °F. | 110 | 117 | 117 | 390 | 400 |

| | Stream | | | | |
|---|---|---|---|---|---|
| | S-11 | S-12 | G-12 | S-13 | S-14 | 15 |
| MSCF/D | — | — | 7.6 | — | — | 3.6 |
| Mole % | | | | | | |
| $H_2$ | — | — | 97.2 | — | — | — |
| Hydrocarbon | — | — | 0.4 | — | — | — |
| $H_2O$ | — | — | 2.4 | — | — | 100 |
| Mole/Hr | — | — | 837 | — | — | 394 |
| Lb/Hr | | | | | | |
| Carbon (1 × 10⁵) | 1.2 | 1.2 | — | 1.2 | 1.2 | — |
| Stainless Steel (1 × 10⁵) | 0.5 | 0.5 | — | 0.5 | 0.5 | — |
| Steam (1 × 10³) | — | — | — | — | — | 7.1 |
| Wt. % on Carbon | | | | | | |
| Hydrocarbon | 0.4 | 0.4 | — | 7.1 | 9.6 | — |
| $H_2O$ | 0.3 | 0.3 | — | — | — | — |
| Temperature, °F. | 300 | 200 | 200 | 265 | 290 | 486 |

The present process has its greatest utility in the separation and recovery of hydrogen from hydrogen in admixture with hydrocarbons, or hydrocarbons contaminated with various acidic, polar, or non-polar compounds other than hydrocarbons. Hydrogen of selected, high purity can be readily recovered from hydrogen gas admixed with up to about 50 percent, or higher hydrocarbons, suitably from about 10 percent to about 50 percent hydrocarbons, with additional contaminants such as carbon monoxide, carbon dioxide, hydrogen sulfide, ammonia, sulfur dioxide, hydrogen cyanide, mercaptans and the like.

The adsorbent solids can be employed as admixtures or composites which contain a ferromagnetic or ferrimagnetic component or substance. Exemplary of such ferromagnetic and ferrimagnetic substances are magnetic $Fe_3O_4$, $\gamma$-iron oxide ($Fe_2O_4$), ferrites of the form $MO.Fe_2O_3$, wherein M is a metal or mixture of metals such as Zn, Mn, Cu, etc.; ferromagnetic elements including iron, nickel, cobalt and gadolinium, alloys of ferromagnetic elements, etc. The adsorbent solids are chosen to suit the particular feed and the contaminant substance, or substances, that is to be removed from the feed. Inorganic, organic or high molecular weight inorganic or organic adsorbents may be used.

Exemplary of adsorbent solids are activated carbons, treated activated carbons, molecular-sieving carbon; selected artificially synthesized zeolites, such as those having some particular synthesized zeolites, such as those having some particular ratio of principal components identified as: "Type A"; "Type L"; "Type X"; "Type Y"; "Type ZSM"; mordenite; faujasite; erionite; and the like; those zeolites which have particular silica-alumina ratio and those in which the original sodium cations are exchanged to other cations; selected silica-gels such as those having some particular relative components of silica, alumina and ferric oxides, those which have particular steric properties as the average pore diameter, specific surface area, pore volume and others; selected activated aluminas such as those having particular components of aluminum oxide and water, those hydrated forms, some particular crystal forms, those which have a particular structure; activated clay or selected acid clays such as montmorillonite in which case base is exchange holloysite or attapulgite. Other suitable zeolites, and their method of preparation, are given, e.g., in U.S. Pat. Nos. 2,882,243; 2,882,244; 3,130,007; 3,410,808; 3,733,390; 3,827,968 and patents mentioned therein, herein incorporated by reference.

Other adsorbents suitable in the practice of the invention include cation-exchange resins with exchange groups of benzene sulfonic acid, carboxylic acid, phosphoric acid; strongly or weakly basic anion-exchange resins; high molecular weight particles of styrenedivinylbenzene copolymer, or its halomethylated, or cyanoethylated polymers; acrylonitrile copolymers; high molecular weight compounds having several functional groups such as cyano, cyanomethyl, chloromethyl, thioether, sulfone, isocyanate, thiocyanate, thiourea, allyl, acetyl-acetone, aldehyde, ketone, aliphatic, anhydride, ester, halogen, nitro and others.

Preferred adsorbents for achieving high adsorption-desorption rates are activated carbons, molecular-sieving carbon, synthetic zeolites and high molecular weight organic materials. These adsorbents generally show a high adsorption exchange rate, due to their chemical affinity for adsorption of various contaminants. Synthetic zeolites provide a particularly useful class of inorganic adsorbents because the adsorption power of the molecules selected for adsorption onto zeolites can easily be altered by exchanging sodium ions which usually come from the original production steps into some other cations to change their crystal structure or electron configurations to the desired forms. Usually Group I metal ions such as lithium, potassium, rubidium, cesium; silver, copper; Group II metal ions such as beryllium, magnesium, calcium, strontium, barium, zinc, cadmium, mercury; titanium, vanadium, chromium, nickel, cobalt, iron, manganese; rare earth metals; uranium; and lead cations or their mixtures are used to replace sodium ions originally contained in the zeolites. The more effective sets of cations are: potassium and lithium; potassium and calcium; potassium and cadmium; potassium and iron; potassium and nickel; potassium and cobalt; potassium and barium; potassium and magnesium; calcium and magnesium; calcium and manganese; lithium and manganese; barium and sodium; barium and lead; iron and uranium; and others. The synthetic zeolite adsorbent solids will typically contain 75-98% of the zeolite component and 2-25% of a matrix, (e.g., binder), component. The zeolites will usually be exchanged with sufficient cations to reduce the sodium level of the zeolite to less than 5 wt. %, preferably less than 1 wt. %. Reference in this regard is made to the following U.S. Pat. Nos. 3,140,249; 3,140,251; 3,140,252 and 3,140,253, which are incorporated herein by reference.

When the magnetizable component is admixed with nonmagnetic adsorbent particles, it is preferred that the volume fraction of the magnetizable component exceed 25 volume percent, more preferably it should exceed 50 volume percent, and more preferably more than 60 volume percent, to obtain the greatest bed stability at the lowest applied magnetic field strength.

In case of a composite of the magnetizable component and the adsorbent, the ferromagnetic and/or ferrimagnetic material will comprise from about 1 to about 25 percent, preferably from about 5 to about 15 percent, based on the total volume of the composite adsorbent. In any event, the composite should have a magnetization of at least 50 gauss, preferably greater than 250 gauss.

The composites of the magnetizable component and the adsorbent may be prepared as follows: the magnetic component such as 400 Series stainless steel, particles and the adsorbent, e.g., the zeolite sieve, are admixed with a base (matrix or binder) for the adsorbent and a relatively homogeneous gel is formed. The adsorbent base may be comprised of, for example, silica, alumina or silicaalumina. The gel is then dried, calcined and sized. Suitable techniques for sizing and shaping the composite adsorbent are extrusion, pilling, beading, spray drying, etc. The magnetizable component may also be composited with the adsorbent by impregnation, cogelling, coprecipitation, etc.

The bed particles (composites or admixtures) will typically have an average particle diameter ranging from about 50 to about 1500 microns, preferably from about 100 to about 1000 microns, and more preferably from about 175 to about 850 microns. The particles may be of any shape, e.g., spherical, irregular shaped or elongated.

The application of a magnetic field to the fluidized, expanded or levitated particles containing the magnetizable particles in the adsorption or desorption zones in accordance with the invention is not limited to any specific method of producing the magnetic field. Conventional permanent magnets and/or electromagnets can be employed to provide the magnetic field used in the practice of the present invention. The positioning of the magnets will, of course, vary with the solids used, degree of fluidization required and the effects desired. Typically a toroidally shaped electromagnet is employed to surround at least a portion of the fluidized bed as this provides the most uniform magnetic field and consequently the best stability throughout the bed. The electromagnets may be energized by alternating or direct current, although direct current energized magnetic fields are preferred. Such electromagnets when powered by direct current with the use of a rheostat are particularly desirable for applying magnetic field to the bed particles and to provide an excellent method of stabilizing the fluidization of the bed particles in response to the flow of the fluidizing medium.

The magnet can be of any size, strength or shape and can be placed above or below the bed to achieve special effects. The magnets employed can be placed within or without the vessel and may be employed as an integral portion of the vessel structure itself. The process is not limited to any particular vessel material and it can be readily adapted for use in contacting vessels currently employed by industry.

The amount of magnetic field to be applied to the fluidized solids in the contacting zones (adsorption and desorption zones) will, of course, depend on the desired magnetization for the magnetizable particles and the amount of stabilization desired. Particles having relatively weak magnetic properties, e.g., cobalt, nickel, etc., will require the application of a stronger magnetic field than particulate solids having strong ferromagnetic properties, e.g., iron, to achieve similar stabilization effects. The size and shape of the solids will also obviously have an effect on the strength of the magnetic field to be employed. However, since the strength of the field produced by an electromagnet can be adjusted by adjusting the field strength of the electromagnet the field strength employed can be readily adjusted to achieve the desired degree of stabilization for the particular system employed. Specific methods of applying the magnetic field are also described in U.S. Pat. Nos. 3,440,731; 3,439,899; 4,115,927 and 4,143,469; British Pat. No. 1,148,513 and in the published literature, e.g., M. V. Filippov, Applied Magnetohydrodyanamics, *Trudy Instituta Fizika Akad. Nauk.*, Latviiskoi SSR 12:215-236 (1960); Ivanov et al, *Kinet. Kavel*, 11 (5):1214-1219 (1970); Ivanov et al, *Zhurnal Prikladnoi Khimii*, 45:248-252 (1972); and R. E. Rosensweig, *Science*, 204:57-60 (1979), which are incorporated herein by reference. The most preferred applied magnetic field will be a uniform magnetic field such as described in U.S. Pat. No. 4,115,927. Typically, the empty vessel applied magnetic field, as taught in U.S. Pat. No. 4,115,927, will range from about 50 to about 1500 oersteds, preferably from about 100 to about 600 oersteds and more preferably from about 125 to about 400 oersteds.

The feed from a variety of sources can be used to supply hydrogen, e.g., catalytic cracking off-gas, gas from catalytic reforming and the like.

It is apparent that the present invention is subject to various modifications and changes without departing from the spirit and scope thereof.

Having described the invention, what is claimed is:

1. In an adsorption process for the recovery of hydrogen from a vapor or gas feed containing hydrogen in admixture with one or more component hydrocarbons, alone or in admixture with non-hydrogen components, wherein particulate adsorbent solids are circulated between an adsorption zone for contact with said feed at relatively low temperature to selectively adsorb hydrocarbons and thereby concentrate the hydrogen within the off gas from said adsorption zone for recovery, the particulate adsorbent solids which selectively adsorb hydrocarbon components are transported to a desorption zone operated at sufficient temperature above that of the adsorption zone to desorb hydrocarbon and regenerate the said particulate adsorbent solids, the regenerated particulate adsorbent solids are cooled and recycled to said adsorption zone the improvement comprising (a) contacting countercurrently said feed in said adsorption zone with a downwardly moving, fluidized bed of the particulate adsorbent solids provided with a magnetic component, magnetically stabilizing said bed to suppress the gross circulation of adsorbent solids within said bed, while adsorbing hydrocarbons from said feed on said bed, withdrawing from said adsorption zone a hydrocarbon-denuded gas stream of higher hydrogen content than that contained in the feed entering said magnetically stabilized adsorption zone, withdrawing hydrocarbon enriched, hydrogen-containing particulate adsorbent solids from said magnetically stabilized adsorption zone and passing same to a hydrogen displacement zone, (b) contacting countercurrently said hydrocarbon enriched, hydrogen containing particulate adsorbent solids in said hydrogen displacement zone by passing same in plug flow and contacting same with a hydrocarbon gas sufficient to substantially displace hydrogen, passing the displaced hydrogen into the adsorption zone, and removing the hydrogen-denuded, hydrocarbon-containing particulate adsorbent solids from said hydrogen displacement zone and transporting same to the desorption zone, (c) heating in said desorption zone, a fluidized bed of said hydrogen-denuded, hydrocarbon-containing particulate solids at temperature sufficient to desorb hydrocarbons from said particulate solids, removing hydrocarbons from said zone, and passing particulate adsorbent solids containing at least residual amounts of hydrocarbons to a steam stripping zone, (d) in said steam stripping zone, countercurrently contacting with steam the residual hydrocarbons-containing particulate adsorbent solids as a moving bed to desorb and substantially displace the residual hydrocarbons with steam, and then transporting the steam-containing particulate adsorbent solids to a water removal zone, and (e) in said water removal zone, contacting the wet particulate adsorbent solids with hydrogen to displace water and dry the particulate adsorbent solids, recovering hydrogen, and the dry particulate, regenerated adsorbent solids are then transported to a cooling zone, and (f) in said cooling zone, the regenerated particulate adsorbent solids are cooled, and said cooled adsorbent solids then passed to the adsorption zone.

2. The process of claim 1 wherein the steam stripping zone (d) comprises a fluidized bed, magnetically stabilized to suppress the gross circulation of solids within said bed, and the cooling zone (f) contains a fluidized bed of regenerated particulate adsorbent solids in heat exchange relationship with a cooling fluid.

3. The process of claim 1 or 2 wherein the temperature of the adsorption zone (a) ranges from about 40° F. to about 300° F., and the temperature of the hydrogen displacement zone (b) ranges about 10° F. to about 150° F. higher than the temperature of said adsorption zone.

4. The process of claims 1 or 2 wherein the adsorbent solids entering the hydrogen displacement zone (b) from said adsorption zone (a) are fluidized, and stabilized by an applied magnetic field.

5. The process of claim 1 or 2 wherein the adsorbent solids entering the hydrocarbon displacement zone (b) from said adsorption zone (a) are fluidized to form a bed or said solids, the bed is stabilized by an applied magnetic field, and a gradient temperature is applied across said bed, the temperature at the bottom of said bed ranging about 60° F. to about 450° F. above the temperature at the top of said bed.

6. The process of claims 1 or 2 wherein the temperature of the desorption zone (c) ranges from about 300° F. to about 600° F., and the hydrocarbon stripping zone (d) is operated at a temperature ranging from about 300° F. to about 600° F.

7. The process of claims 1 or 2 wherein the water removal zone (e) is staged, and includes a first stage wherein the adsorbent particles are countercurrently contacted with the hydrogen at a rate to essentially equal the volume of the steam in the interstices and pores to substantially desorb the steam, and a second stage wherein residual water is desorbed by countercurrent contact with hydrogen to evaporatively cool and dry the adsorbent particles.

8. The process of claims 1 or 2 wherein said adsorption particles and magnetizable component have an average mean particle diameter ranging from 50 to about 1500 microns.

9. The process of claims 1 or 2 wherein said adsorbent particles and magnetizable component are composited.

10. The process of claims 1 or 2 wherein said adsorbent particles include activated carbon, treated activated carbon or molecular-sieving carbon particles.

11. The process of claim 1 wherein the adsorbent solids entering the hydrocarbon displacement zone (b) from said adsorption zone (a) are fluidized to form a bed or said solids, the bed is stabilized by an applied magnetic field, and a gradient temperature is applied across said bed, the temperature at the bottom of said bed ranging about 60° F. to about 450° F. above the temperature at the top of said bed, the temperature of the desorption zone (c) ranges from about 300° F. to about 600° F., and the hydrocarbon stripping zone (d) is operated at a temperature ranging from about 300° F. to about 600° F., and the water removal zone (e) is staged, and includes a first stage wherein the adsorbent particles are countercurrently contacted with the hydrogen at a rate to essentially equal the volume of the steam in the interstices and pores to substantially desorb the steam, and a second stage wherein residual water is desorbed by countercurrent contact with hydrogen to evaporatively cool and dry the adsorbent particles.

* * * * *